US012487543B2

(12) United States Patent
Munetsugu et al.

(10) Patent No.: US 12,487,543 B2
(45) Date of Patent: Dec. 2, 2025

(54) TONER CONTAINER AND IMAGE FORMING SYSTEM

(71) Applicant: CANON KABUSHIKI KAISHA, Tokyo (JP)

(72) Inventors: Hiroyuki Munetsugu, Kanagawa (JP); Hiroshi Takarada, Kanagawa (JP); Mitsuhiro Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/817,460

(22) Filed: Aug. 28, 2024

(65) Prior Publication Data

US 2024/0427262 A1 Dec. 26, 2024

Related U.S. Application Data

(63) Continuation of application No. 18/207,819, filed on Jun. 9, 2023, now Pat. No. 12,105,441, which is a (Continued)

(30) Foreign Application Priority Data

Dec. 15, 2020 (JP) ................................ 2020-207976

(51) Int. Cl.
*G03G 15/08* (2006.01)

(52) U.S. Cl.
CPC ..... *G03G 15/0865* (2013.01); *G03G 15/0822* (2013.01); *G03G 15/0874* (2013.01);

(Continued)

(58) Field of Classification Search
CPC ........... G03G 15/0865; G03G 15/0822; G03G 15/0874; G03G 15/0877; G03G 15/0879;

(Continued)

(56) References Cited

U.S. PATENT DOCUMENTS 6,882,817 B2 4/2005 Kita et al.
7,046,938 B2 5/2006 Yamamoto et al.

(Continued)

FOREIGN PATENT DOCUMENTS

JP H08-30084 A 2/1996
JP 2005-309473 A 11/2005

(Continued)

OTHER PUBLICATIONS

International Search Report and Written Opinion for International Patent Application No. PCT/JP2021/046390.

(Continued)

*Primary Examiner* — Joseph S Wong
(74) *Attorney, Agent, or Firm* — Venable LLP

(57) ABSTRACT

A toner container includes a storage portion configured to store toner and a communicating member including a receiving port, a discharge port, and a passage. The passage includes a first inclined surface and a second inclined surface connecting the first inclined surface and the discharge port to each other. When viewed in a third direction perpendicularly intersecting with both of a first direction and a second direction, the first inclined surface is inclined with respect to the second direction such that a more downstream portion of the first inclined surface in the first direction is closer to the discharge port in the second direction, and the second inclined surface is inclined with respect to the second direction such that a more downstream portion of the second inclined surface in the first direction is closer to the discharge port in the second direction.

8 Claims, 10 Drawing Sheets

Related U.S. Application Data continuation of application No. PCT/JP2021/046390, filed on Dec. 15, 2021.

(52) U.S. Cl.
CPC ..... *G03G 15/0877* (2013.01); *G03G 15/0879* (2013.01); *G03G 15/0886* (2013.01); *G03G 15/0887* (2013.01); *G03G 15/0891* (2013.01); *G03G 15/0896* (2013.01); *G03G 2215/066* (2013.01); *G03G 2215/0682* (2013.01); *G03G 2215/0692* (2013.01); *G03G 2215/08* (2013.01)

(58) Field of Classification Search
CPC ........... G03G 15/0886; G03G 15/0887; G03G 15/0891; G03G 15/0896; G03G 2215/066; G03G 2215/0682; G03G 2215/0692; G03G 2215/08
See application file for complete search history.

(56) References Cited

U.S. PATENT DOCUMENTS

| | | | | |
|---|---|---|---|---|
| 7,346,299 | B2 * | 3/2008 | Muramatsu | G03G 15/0874 399/260 |
| 2001/0041083 | A1 | 11/2001 | Terazawa et al. | |
| 2003/0215267 | A1 | 11/2003 | Kita | |
| 2004/0117971 | A1 | 6/2004 | Sato et al. | |
| 2004/0131392 | A1 | 7/2004 | Matsumoto et al. | |
| 2005/0169664 | A1 | 8/2005 | Arimitsu et al. | |
| 2005/0220486 | A1 | 10/2005 | Miyabe et al. | |
| 2005/0244188 | A1 | 11/2005 | Sato et al. | |
| 2005/0254862 | A1 | 11/2005 | Toba et al. | |
| 2006/0051135 | A1 | 3/2006 | Sato et al. | |
| 2006/0072938 | A1 | 4/2006 | Sato et al. | |
| 2006/0216065 | A1 | 9/2006 | Yamamoto et al. | |
| 2006/0285878 | A1 | 12/2006 | Arimitsu et al. | |
| 2007/0053722 | A1 | 3/2007 | Sato et al. | |
| 2007/0103702 | A1 | 5/2007 | Yamamoto et al. | |
| 2008/0025757 | A1 | 1/2008 | Sato et al. | |
| 2008/0219683 | A1 * | 9/2008 | Muramatsu | G03G 15/0879 399/27 |
| 2009/0290903 | A1 | 11/2009 | Horikawa et al. | |
| 2009/0290904 | A1 | 11/2009 | Kawai et al. | |
| 2009/0297202 | A1 | 12/2009 | Takarada | |
| 2009/0297214 | A1 | 12/2009 | Chadani et al. | |
| 2009/0297215 | A1 | 12/2009 | Munetsugu et al. | |
| 2011/0280621 | A1 | 11/2011 | Suzuki et al. | |
| 2013/0022368 | A1 | 1/2013 | Takarada et al. | |
| 2013/0114972 | A1 | 5/2013 | Takarada et al. | |
| 2013/0121720 | A1 | 5/2013 | Hoshi et al. | |
| 2013/0170851 | A1 | 7/2013 | Takarada et al. | |
| 2015/0037065 | A1 | 2/2015 | Takarada et al. | |
| 2015/0139684 | A1 | 5/2015 | Nakazawa et al. | |
| 2015/0253723 | A1 | 9/2015 | Morioka et al. | |
| 2016/0257041 | A1 | 9/2016 | Takarada et al. | |
| 2017/0261926 | A1 | 9/2017 | Kashiide et al. | |
| 2017/0261927 | A1 | 9/2017 | Sato et al. | |
| 2018/0039206 | A1 | 2/2018 | Hoshi et al. | |
| 2018/0253057 | A1 | 9/2018 | Koishi et al. | |
| 2018/0321637 | A1 | 11/2018 | Sato et al. | |
| 2019/0179258 | A1 | 6/2019 | Kashiide et al. | |
| 2019/0258202 | A1 | 8/2019 | Kamoshida et al. | |
| 2020/0142353 | A1 | 5/2020 | Sato et al. | |
| 2020/0249623 | A1 | 8/2020 | Sato et al. | |
| 2020/0409304 | A1 | 12/2020 | Kashiide et al. | |
| 2021/0263467 | A1 | 8/2021 | Sato et al. | |
| 2021/0311431 | A1 | 10/2021 | Kashiide et al. | |
| 2021/0349412 | A1 | 11/2021 | Kim et al. | |
| 2022/0035307 | A1 | 2/2022 | Munetsugu et al. | |
| 2022/0155708 | A1 | 5/2022 | Sato et al. | |
| 2022/0155722 | A1 | 5/2022 | Kashiide et al. | |
| 2022/0197211 | A1 | 6/2022 | Sato et al. | |
| 2022/0404738 | A1 | 12/2022 | Toba et al. | |
| 2022/0413414 | A1 * | 12/2022 | Ozaki | G03G 15/0886 |
| 2023/0017354 | A1 | 1/2023 | Ozaki et al. | |
| 2023/0031856 | A1 | 2/2023 | Munetsugu et al. | |
| 2023/0096202 | A1 | 3/2023 | Sato et al. | |
| 2023/0176503 | A1 | 6/2023 | Fukui et al. | |
| 2023/0185234 | A1 | 6/2023 | Kashiide et al. | |
| 2023/0205114 | A1 | 6/2023 | Ozaki et al. | |
| 2023/0205129 | A1 | 6/2023 | Suetsugu et al. | |
| 2023/0244157 | A1 | 8/2023 | Kubo et al. | |
| 2023/0266695 | A1 | 8/2023 | Munetsugu et al. | |
| 2023/0297024 | A1 | 9/2023 | Sato et al. | |

FOREIGN PATENT DOCUMENTS

| | | | |
|---|---|---|---|
| JP | 2008-309858 | A | 12/2008 |
| JP | 2015-227924 | A | 12/2015 |

OTHER PUBLICATIONS

Co-pending U.S. Appl. No. 18/228,032, filed Jul. 31, 2023.
Co-pending U.S. Appl. No. 18/235,957, filed Aug. 21, 2023.
Co-pending U.S. Appl. No. 18/241,266, filed Sep. 1, 2023.

* cited by examiner

TONER CONTAINER AND IMAGE FORMING SYSTEM

CROSS-REFERENCE TO RELATED APPLICATIONS

This application is a Continuation of International Patent Application No. PCT/JP2021/046390, filed Dec. 15, 2021, which claims the benefit of Japanese Patent Application No. 2020-207976, filed Dec. 15, 2020, both of which are hereby incorporated by reference herein in their entirety.

BACKGROUND OF THE INVENTION

Field of the Invention

This invention relates to a toner container for storing toner and an image forming system for forming an image on a recording material by using the toner.

Description of the Related Art

Image forming apparatuses of electrophotographic systems form images by transferring a toner image formed on a surface of a photosensitive drum by using toner, serving as developer, onto a transfer material (recording material), serving as a recording medium. Then, as replenishment systems of the developer, process cartridge system and toner replenishment system are known. The process cartridge system is a system in which the photosensitive drum and developer container are integrated as a process cartridge and, when the developer in the developer container is depleted, the process cartridge is replaced with new one.

On the other hand, the toner replenishment system is a system in which, when the toner is depleted, the toner is resupplied to the developer container. Hitherto, a one-component developing unit for the toner replenishment system in which a toner supply box capable of replenishing the toner is connected to a toner conveyance path conveying the toner is proposed (refer to Japanese Patent Application Laid-Open No. H08-030084). The toner stored in the toner supply box is conveyed to the toner conveyance path by a conveyance screw.

Recently, many different uses such as the process cartridge system and the toner replenishment system described above are demanded for image forming apparatuses by users. Further, various forms are demanded by the users also for the toner containers to be attached to the image forming apparatuses for replenishing the toner.

SUMMARY OF THE INVENTION

According to one aspect of the present invention, a toner container includes a storage portion configured to store toner and including an opening portion at an end of the storage portion in a first direction; and a communicating member connected to the opening portion and aligned with the storage portion in the first direction, the communicating member including a receiving port configured to receive the toner stored in the storage portion, a discharge port through which the toner is discharged and which is open toward a second direction perpendicularly intersecting with the first direction, and a passage configured to allow the toner to pass through from the receiving port to the discharge port, wherein the passage includes a first inclined surface, and a second inclined surface connecting the first inclined surface and the discharge port, wherein, when viewed in a third direction perpendicularly intersecting with both of the first direction and the second direction, the first inclined surface is inclined with respect to the second direction such that a more downstream portion of the first inclined surface in the first direction is closer to the discharge port in the second direction, wherein, when viewed in the third direction, the second inclined surface is inclined with respect to the second direction such that a more downstream portion of the second inclined surface in the first direction is closer to the discharge port in the second direction, and the second inclined surface is inclined at an inclination angle smaller than an inclination angle of the first inclined surface with respect to the second direction, and wherein a boundary position between the first inclined surface and the second inclined surface in the first direction is positioned between a position of a first end of the discharge port in the first direction and a position of a second end of the discharge port in the first direction.

Further features of the present invention will become apparent from the following description of exemplary embodiments with reference to the attached drawings.

Further features and other advantages of the present invention will become apparent from the following description of exemplary embodiments with reference to the attached drawings. To be noted, in the attached drawings, the same reference characters are put on the same or similar configurations.

DESCRIPTION OF THE EMBODIMENTS

Hereinafter, exemplary embodiments of the present disclosure will be described with reference to drawings.

General Arrangement

Figure 2A:
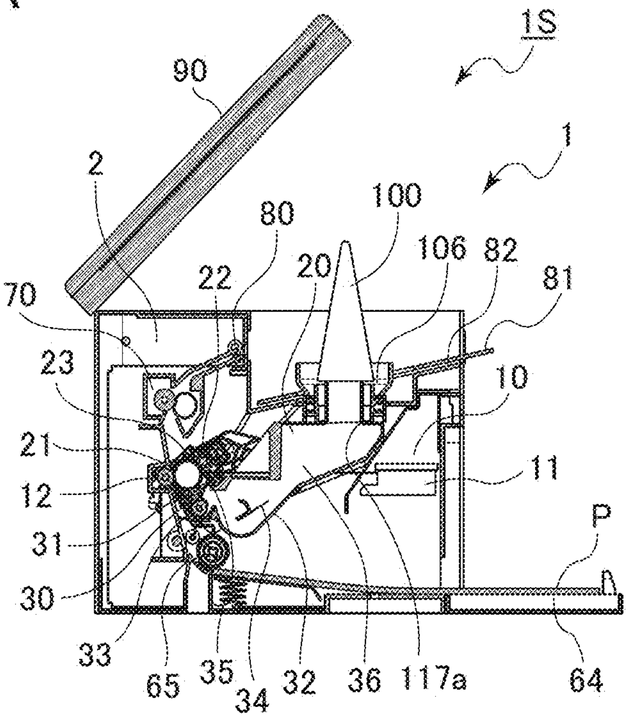
FIG. 2A is a cross-sectional view illustrating an image forming apparatus of the embodiment.

Using FIGS. 2A and 2B, an image forming apparatus 1 of the present embodiment will be described. FIG. 2A is a cross-sectional view illustrating a schematic configuration of the image forming apparatus 1. The image forming apparatus 1 of the present embodiment is a monochrome printer forming an image on a recording material P based on image information input from an external apparatus. The recording material P includes various sheet materials different in a material including paper such as standard paper and cardboard, a plastic film such as a sheet for an overhead projector, a sheet of a special shape such as an envelope and index paper, cloth, and the like.

Figure 2B:
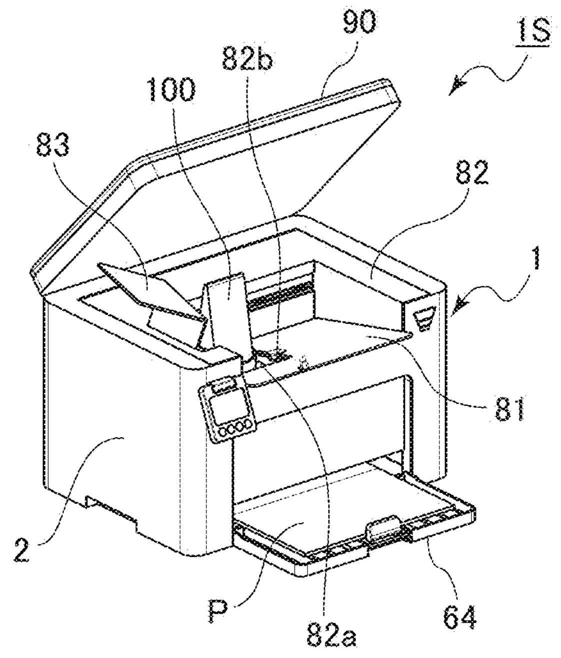
FIG. 2B is a perspective view illustrating the image forming apparatus of the embodiment.

As illustrated in FIGS. 2A and 2B, a printer body 2, serving as an apparatus body, includes an image forming portion 10 forming a toner image on the recording material P, a tray 64 supporting the recording material P, and a pickup roller 66, serving as a feed unit feeding the recording material P to the image forming portion 10. Further, the printer body 2 includes a fixing unit 70 fixing the toner image formed by the image forming portion 10 on the recording material P, and a sheet discharge roller pair 80 discharging the recording material P, on which a fixation process of the toner image has been performed, to the outside of the printer body 2.

The image forming portion 10 includes a scanner unit 11, a process cartridge 20 of an electrophotographic system, a transfer roller 12 transferring the toner image, which has been formed on a photosensitive drum 21 of the process cartridge 20 as a developer image, onto the recording material P. The process cartridge 20 includes the photosensitive drum 21, and a charge roller 22, a pre-exposure unit 23, and a developing unit 30, which are arranged around the photosensitive drum 21. The process cartridge 20 is detachably attached with respect to the printer body 2. To be noted, the printer body 2 refers to a portion of the image forming apparatus 1 excluding the process cartridge 20.

The photosensitive drum 21 is an image bearing member (electrophotographic photosensitive member) formed in a cylindrical shape. The photosensitive drum 21 of the present embodiment includes a photosensitive layer formed of a negatively chargeable organic photoconductor on a drum shaped substrate formed of aluminum. The photosensitive drum 21, serving as the image bearing member, is rotatably driven in a predetermined direction (clockwise direction in the figure) by a motor at a predetermined process speed.

The charge roller 22 comes into contact with the photosensitive drum 21 with predetermined pressure contact force, and forms a charging portion. Further, by applying a desired charge voltage with a charging high voltage power supply, a surface of the photosensitive drum 21 is uniformly charged to predetermined electrical potential. In the present embodiment, the photosensitive drum 21 is charged to a negative polarity by the charge roller 22. So as to cause to generate stable discharge at the charging portion, prior to arrival at the charging portion, a surface charge of the photosensitive drum 21 is neutralized by the pre-exposure unit 23.

The scanner unit 11, serving as an exposing unit, scans and exposes the surface of the photosensitive drum 21 by irradiating the photosensitive drum 21 with a laser beam corresponding to the image information input from the external apparatus by using a polygon mirror. By this exposure, an electrostatic latent image corresponding to the image information is formed on the surface of the photosensitive drum 21. To be noted, the scanner unit 11 is not limited to laser scanner apparatuses, and, for example, it is acceptable to apply a light-emitting diode (LED) exposure apparatus including an LED array in which a plurality of LEDs are arranged along a longitudinal direction of the photosensitive drum 21.

The developing unit 30 includes a developing roller 31, serving as a developer bearing member bearing developer, a developer container 32 storing the toner, serving as the developer, and a supply roller 33 supplying the developer to the developing roller 31. The developing roller 31 and the supply roller 33 are rotatably supported by the developer container 32 which is also a frame body of the developing unit 30. Further, the developing roller 31 is arranged at an opening portion of the developer container 32 so as to face the photosensitive drum 21. The supply roller 33 rotatably comes into contact with the developing roller 31, the toner stored in the developer container 32 is applied to a surface of the developing roller 31 by the supply roller 33. To be noted, if a configuration allows a sufficient supply of the toner to the developing roller 31, the supply roller 33 is not necessarily needed.

As a developing method, the developing unit 30 of the present embodiment uses a contact developing method. That is, the toner layer borne by the developing roller 31 comes into contact with the photosensitive drum 21 in a developing portion (developing region) in which the photosensitive drum 21 and the developing roller 31 face each other. A developing voltage is applied to the developing roller 31 by a developing high voltage power supply. By transferring the toner borne by the developing roller 31 from the developing roller 31 onto a drum surface under the developing voltage in accordance with the potential distribution in the surface of the photosensitive drum 21, the electrostatic latent image is developed to the toner image. To be noted, in the present embodiment, a reversal development system is applied. That is, the toner image is formed by adhering the toner to a surface region of the photosensitive drum 21 in which a charge amount is attenuated by being exposed in an exposure step after being charged in a charging step.

Further, in the present embodiment, the toner having a particle diameter of 6 micrometers (μm) and a normal charge polarity of the negative polarity is used. According to the present embodiment, polymerized toner produced by a polymerization method is applied to the toner of the present embodiment. Further, the toner of the present embodiment does not contain a magnetic component, and is so called nonmagnetic one-component developer in which the toner is borne by the developing roller 31 mainly by an intermolecular force or an electrostatic force (image force). However, it is acceptable to use one-component developer containing the magnetic component. Further, in the one-component developer, sometimes, additives (for example, wax and a silica microparticle) besides the toner particle are contained. Further, it is acceptable to use two-component developer constituted by nonmagnetic toner and carrier having magnetism. In a case where the developer having the magnetism is used, as the developer bearing member, for example, a cylindrical developing sleeve arranged with a magnet inside is used.

A toner storage chamber 36 for storing the toner and an agitation member 34, serving as an agitation unit arranged in an interior of the toner storage chamber 36, are disposed in the developer container 32. The agitation member 34 agitates the toner in an interior of the developer container 32 by being driven and rotated by a motor, not shown, and sends the toner toward the developing roller 31 and the supply roller 33. Further, the agitation member 34 has a role of uniformizing the toner in the interior of the developer container 32 by agitating the toner not used for development and peeled off from the developing roller 31 and the toner replenished from the outside by a toner pack 100, described below, in the interior of the developer container 32. An opening 117*a* (receiving port) for receiving the toner replenished from the toner pack 100 is disposed in an upper part of the developer container 32. To be noted, the agitation member 34 is not limited to a rotating type. For example, it is acceptable to apply an agitation member of a swinging type.

Further, a developing blade 35 regulating a toner amount borne by the developing roller 31 is arranged to an opening, to which the developing roller 31 is arranged, of the developer container 32. Along with the rotation of the developing roller 31, the toner supplied to a surface of the developing roller 31 is thinned to a uniform thickness by passing through a facing portion facing the developing blade 35, and charged to the negative polarity by triboelectrification.

Next, an image forming operation of the image forming apparatus 1 will be described. When an instruction for image formation has been input to the image forming apparatus 1, based on the image information from an external computer connected to the image forming apparatus 1, an image forming process by the image forming portion 10 is started. The scanner unit 11 emits the laser beam toward the photosensitive drum 21 based on the input image information. At this time, the photosensitive drum 21 has been charged beforehand by the charge roller 22, and, by emitting the laser beam, the electrostatic latent image is formed on the photosensitive drum 21. Thereafter, this electrostatic latent image is developed by the developing roller 31, and the toner image is formed on the photosensitive drum 21.

In parallel with the image forming process described above, the recording material P on the tray 64 is sent by the pickup roller 65 one sheet at a time, and conveyed toward a transfer nip, serving as a transfer portion, formed by the transfer roller 12 and the photosensitive roller 21.

To the transfer roller 12, a transfer voltage opposite in polarity to the normal charge polarity of the toner is applied. Thereby, the toner image borne on the photosensitive drum 21 is transferred onto the recording material P passing through the transfer nip. At a time when the recording material P onto which the toner image has been transferred passes through the fixing unit 70, the toner image is heated and pressed. Thereby, a toner particle is melted and, thereafter, fixed, and the toner image is fixed on the recording material P. The recording material P passed through the fixing unit 70 is discharged to the outside of the printer body 2 by the sheet discharge roller pair 80, serving as a sheet discharge unit, and stacked on a sheet discharge tray 81, serving as a stacking portion formed in an upper part of the printer body 2.

Figure 3:
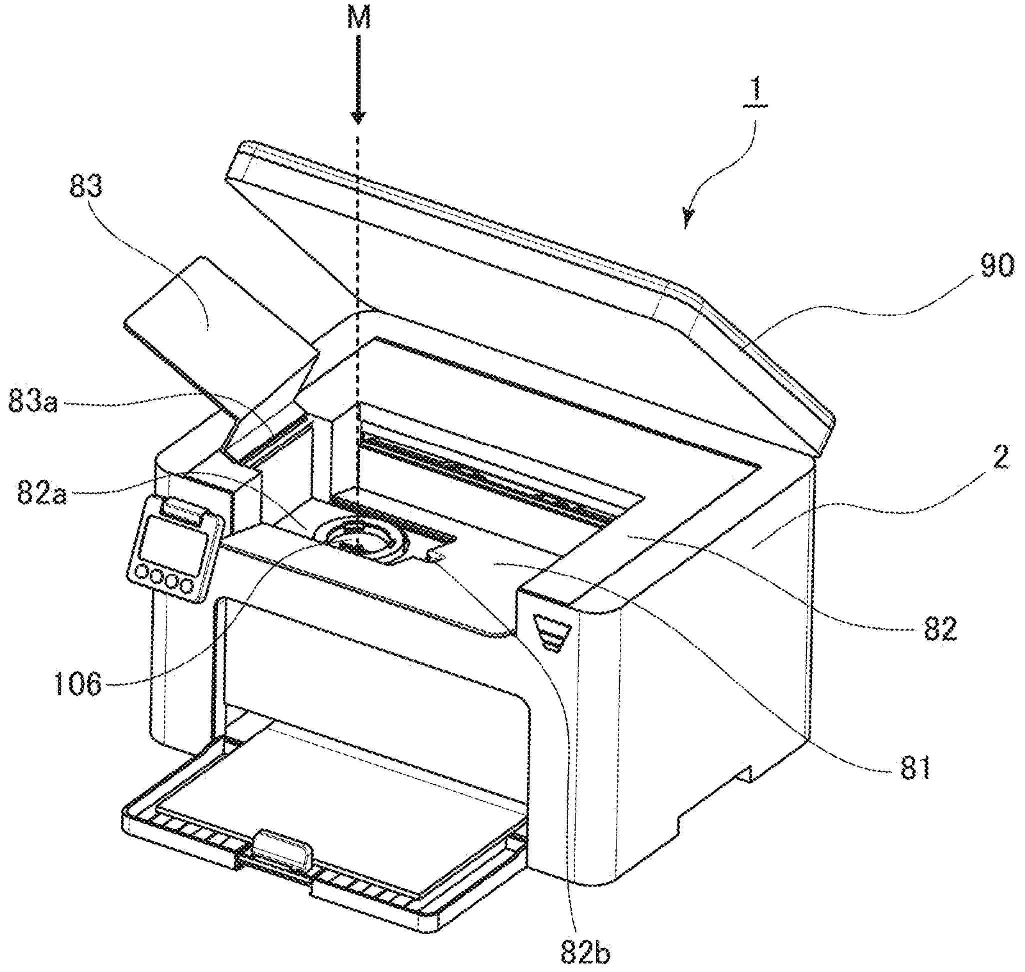
FIG. 3 is a diagram illustrating a state in which a replenishing port of the image forming apparatus of the embodiment is exposed.

Above the process cartridge 20, a top cover 82 constituting an upper surface of a casing of the printer body 2 is disposed, and the sheet discharge tray 81, serving as the stacking portion, is formed on an upper surface of the top cover 82. As illustrated in FIGS. 2B and 3, an opening/closing member 83 is supported by a shaft 83*a* extending in a front-back direction as a center in an openable and closable manner. To be noted, a front side (front) of the image forming apparatus 1 is on the right side in FIG. 2A, and a front discharge method by which the recording material P is stacked on the sheet discharge tray 81 extending to a forward side of sheet discharge roller pair 80 is applied in the present embodiment. An opening portion 82*a* opening upward is formed in the sheer discharge tray 81 of the top cover 82. An attaching portion 106 to which the toner pack 100, described below, is to be attached is disposed in the opening portion 82*a*. An opening, not shown, for receiving the toner discharged from the toner pack 100 is disposed in the attaching portion 106, and the opening disposed in the attaching portion 106 communicates with the opening 117*a* disposed in the upper part of the developer container 32.

The opening/closing member 83 is movable between a closed position covering the attaching portion 106 so as not to allow the toner pack 100 to be attached to the developer container 32 and an opening position exposing the attaching portion 106 so as to allow the toner pack 100 to be attached to the developer container 32. FIGS. 2B and 3 illustrate a state in which the opening/closing member 83 is in the closed position. To be noted, in the state in which the opening/closing member 83 is in the closed position, it is possible to perform the image forming operation described above. In the closed position, the opening/closing member 83 acts as a part of the sheet discharge tray 81. When viewed from the front side of the image forming apparatus 1, the opening/closing member 83 and the opening portion 82*a* are formed on a left side of the sheet discharge tray 81. Further, the opening/closing member 83 is opened to a left direction by hooking a finger from a groove 82*b* disposed in the top cover 82. The opening/closing member 83 is formed in a substantially L shape along a shape of the top cover 82. That is, when viewed in a discharge direction of the recording material P by the sheet discharge roller pair 80, the opening/closing member 83 includes a portion forming a stacking surface, which is substantially flush with the sheet discharge tray 81, by extending in a substantially horizontal direction, and a portion forming a side wall of the sheet discharge tray 81 by rising from an end of the stacking surface in a horizontal direction upward in a substantially vertical direction.

When viewed from above, the opening portion 82*a* of the sheet discharge tray 81 opens so as to expose the attaching portion 106, and, by opening the opening/closing member 83, a user can access the attaching portion 106. To be noted, in the present embodiment, a reading unit 90, serving as an upper unit openable and closable (pivotable) with respect to the printer body 2, is disposed above the top cover 82. The reading unit 90 includes a document table for placing a document and an image sensor for reading the image information from the document placed on the document table. However, it is acceptable that, by not disposing the upper unit, the sheet discharge tray 81 is always exposed when viewed from above in the vertical direction.

In the present embodiment, a system (direct replenishment system) in which, while leaving the developing unit 30 in a state of being attached to the image forming apparatus 1, the user replenishes the toner from the toner pack 100 (refer to FIGS. 2A and 2B) filled with the toner for replenishment to the developing unit 30 is applied. That is, the image forming apparatus 1 and the toner pack 100 constitute an image forming system 1S of the direct replenishment system. In the state of being attached to the image forming apparatus 1, at least part of the toner pack 100 is exposed to the outside.

Therefore, since, in a case where the remainder of the toner in the process cartridge 20 has decreased, the work of removing the process cartridge 20 from the printer body 2 and replacing the process cartridge with new one becomes unnecessary, it is possible to improve usability. Further, it is possible to replenish the toner to the developing unit 30 at a cost lower than replacing the whole of the process cartridge 20. To be noted, also in comparison with a case of replacing only the developing unit 30 of the process cartridge 20, since it is not necessary to replace various rollers and gears such as the developing roller 31, the direct replenishment system can achieve a cost reduction.

Configuration of Toner Pack

Figure 1A:
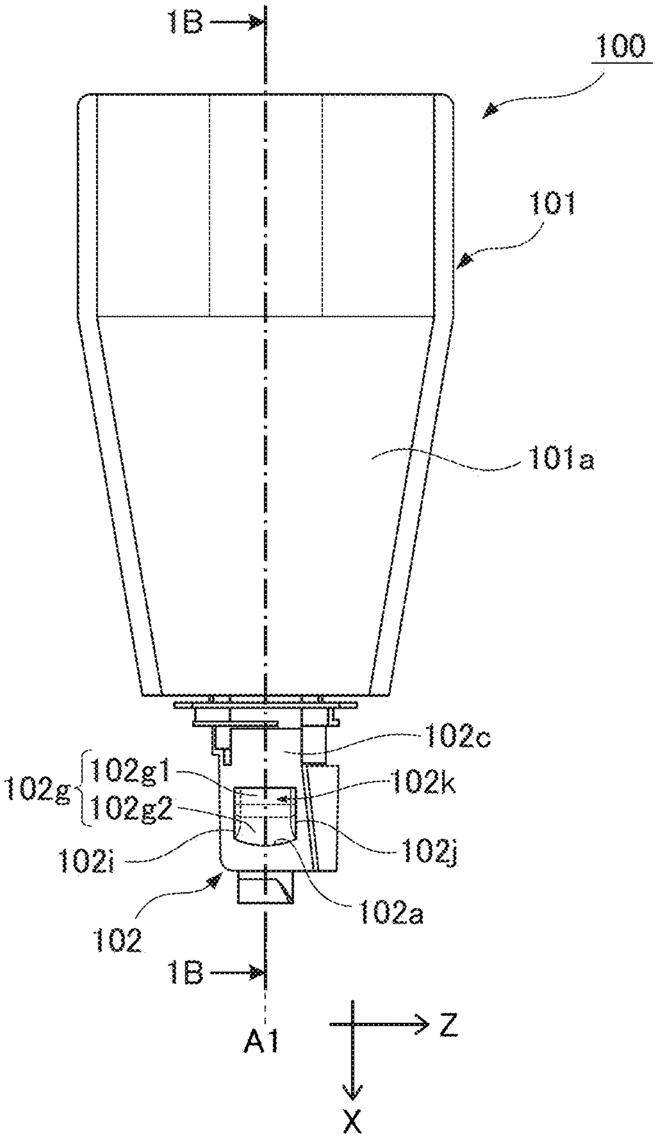
FIG. 1A is a front view illustrating a toner pack of an embodiment of the present disclosure.
Figure 1B:
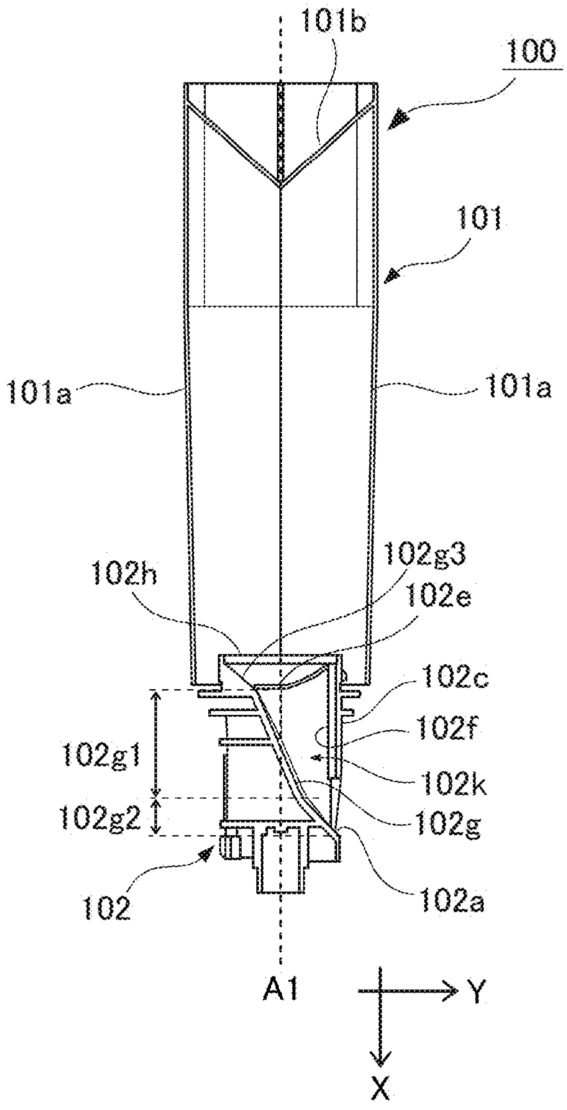
FIG. 1B is a cross-sectional view illustrating the toner pack of the embodiment.
Figure 4A:
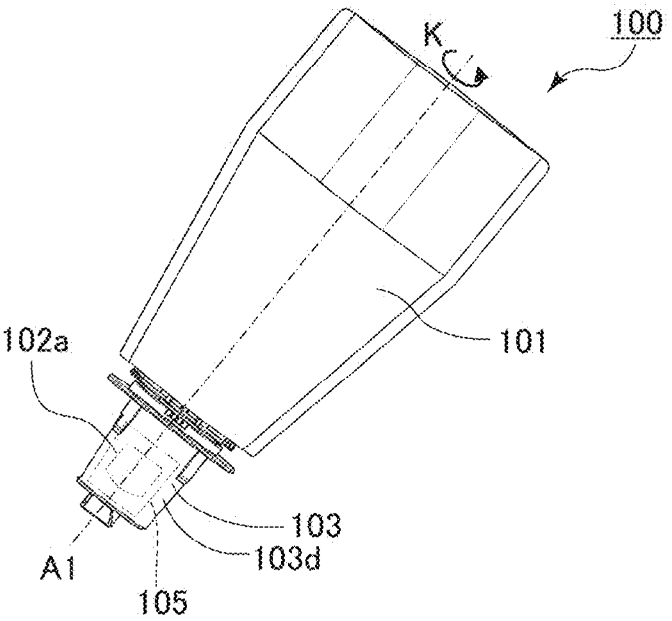
FIG. 4A is a diagram for illustrating a discharge port shutter of the toner pack of the embodiment.
Figure 4B:
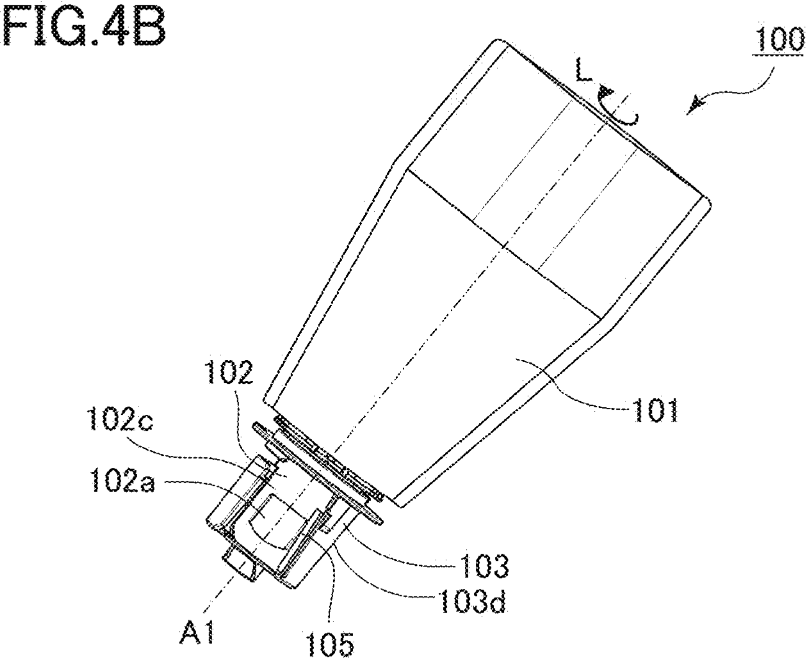
FIG. 4B is a diagram for illustrating the discharge port shutter of the toner pack of the embodiment.
Figure 5:
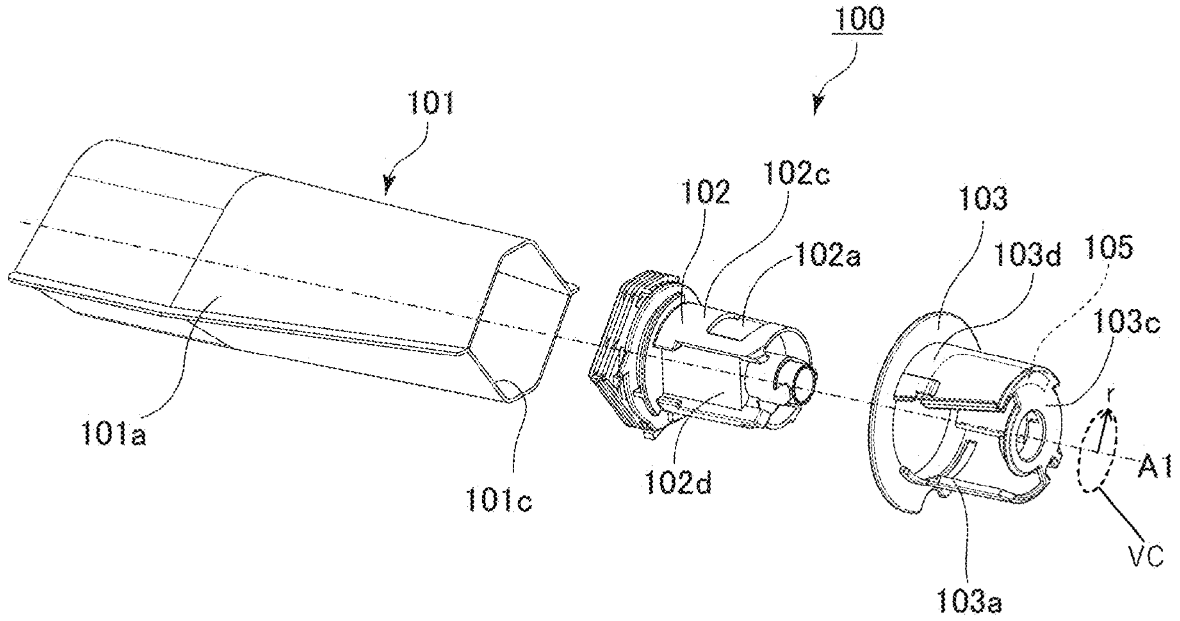
FIG. 5 is an exploded view illustrating the toner pack of the embodiment.

Next, using FIGS. 1A, 1B, 4A, 4B, and 5, a configuration of the toner pack 100 that is a toner container of the present embodiment will be described. FIG. 1A is a front view illustrating the toner pack 100, and FIG. 1B is a cross-sectional view illustrating the toner pack 100 taken along the line 1B-1B of FIG. 1A. FIGS. 4A and 4B are diagrams for illustrating an opening/closing of a discharge port shutter of the toner pack 100. FIG. 5 is an exploded view illustrating the toner pack 100.

As illustrated in FIGS. 1A, 1B, 4A, 4B, and 5, the toner pack 100 includes a storage portion 101 for storing the toner, a nozzle 102 (nozzle portion, pipe, tube, valve), serving as a communicating member, and a shutter 103 (closure member, rotary member). As illustrated in FIGS. 1A and 1B, the storage portion 101 is disposed on a side of a first end in a first direction X, and the nozzle 102 and the shutter 103 are disposed on a side of a second end opposite to the first end. The first direction X is an axis direction A1 of the nozzle 102 having an outline of a substantially tubular (cylindrical) shape, and also a rotational axis direction of the shutter 103 that rotates with respect to the nozzle 102.

The storage portion 101 is a bag-shaped portion (bag body) including a side surface portion 101*a* extending in the first direction X while forming a space (storage space) for storing the toner and a bottom surface portion 101*b* for closing the side of the first end of the storage space in the first direction X. The side of the second end of the storage space in the first direction X becomes an opening 101*c* (opening portion). The storage portion 101 is formed of a flexible material having such flexibility that can be easily deformed by user with the hand. The storage portion 101 of the present embodiment is a pouch formed by pouch processing of a flexible film material (for example, polypropylene sheet). When viewed in a direction perpendicular to the axis A1 (thickness direction of sheets bonded by the pouch processing) the storage portion 101 has a tapered shape in which width in the first direction X becomes narrower from the side of the first end toward the side of the second end (nozzle side) in the first direction X. The storage portion 101 is not limited to the pouch, and a bottle made of resin and a container made of such as paper and vinyl are acceptable.

The nozzle 102 is connected to the storage portion 101 so as to close the opening 101*c* of the storage portion 101 (FIG. 5). The nozzle 102 includes a toner receiving portion 102*e*, serving as a receiving port receiving the toner in an interior of the storage portion 101, a discharge port 102*a* discharging the toner to the outside of the toner pack 100, and a flow path 102*k* (passage) allowing the toner receiving portion 102*e* and the discharge port 102*a* to communicate with each other. That is, the nozzle 102 acts as a communicating portion constituting the flow path (pathway, passage) through which the inside and outside of the toner pack 100 communicate with each other. It is possible to discharge the toner stored in the interior of the storage portion 101 (interior of the storage space) to the outside of the toner pack 100 via the toner receiving portion 102*e*, the flow path 102*k*, and the discharge port 102*a*. To be noted, it is acceptable that the nozzle 102 is constituted integrally with the storage portion 101. Further, a configuration in which, by disposing a seal between the storage portion 101 and the nozzle 102, the storage portion 101 and the discharge port 102*a* communicate with each other in a case of removing the seal is also acceptable.

In a side surface 102*c* (first outer surface) of the nozzle 102, which extends in the first direction X along an imaginary circle VC around the axis A1 as a center, the discharge port 102*a* (opening) is formed so as to communicate with the interior of the storage portion 101.

The shutter 103 is disposed outside of the side surface 102*c* of the nozzle 102. The shutter 103 is rotatably attached with respect to the nozzle 102 around the axis A1 extending along the first direction X as a center. The shutter 103 includes a side surface 103*d*, when viewed in the first direction X, extending outside of the side surface 102*c* of the nozzle 102 in an arc shape around the axis A1 as a center. As illustrated in FIG. 5, an opening 103*a* is disposed in the side surface 103*d*.

The shutter 103 is disposed outside of the side surface 102*c* in a radial direction r of the imaginary circle VC around the axis A1 as a center. The side surface 102*c* of the nozzle 102 is a curved surface protruding toward the outside in the radial direction r of the imaginary circle VC around the axis A1 as a center. An inner surface (surface facing the side surface 102*c* of the nozzle 102) of the shutter 103 is a curved surface along the side surface 102*c* of the nozzle 102 (when viewed in the first direction X, an arc shaped surface). A seal 105 having a substantially rectangular shape is attached to the inner surface of the shutter 103. When viewed from the inside (side of the axis A1 in the radial direction r), the seal 105 has an area at least larger than an opening area of the discharge port 102*a* of the nozzle 102.

As illustrated in FIGS. 4A and 4B, the shutter 103 is configured to rotate around the axis A1 as a center between a closing position (first position) in which the seal 105 closes the discharge port 102*a* of the nozzle 102 and an opening position (second position) opening the discharge port 102*a*. When the shutter 103 is in the opening position, the discharge port 102*a* of the nozzle 102 is exposed from the opening 103*a*. FIG. 4A illustrates a state in which the shutter 103 is in the closing position, and FIG. 4B illustrates a state in which the shutter 103 is in the opening position. By being rotated in an arrow K direction (first rotational direction) around the axis A1 as a center, the shutter 103 which is in the closing position illustrated in FIG. 4A reaches the opening position illustrated in FIG. 4B. Conversely, by rotating from the opening position in an arrow L direction (second rotational direction), the shutter 103 reaches the closing position. In a rotational operation of the shutter 103, the shutter 103 slides with friction on the side surface 102*c* of the nozzle 102 via the seal 105.

In a state where the shutter 103 is in the closing position, the seal 105 prevents the toner from scattering (leakage) from the discharge port 102*a*. Therefore, an elastic material arranged with a predetermined intrusion quantity (compression amount) with respect to the side surface 102*c* is preferably used for the seal 105. Further, so as to seal the toner, the seal 105 extends with a predetermined seal width (equal to or larger than the opening width of the discharge port 102*a* in a circumferential direction around the axis A1 as a center). Over the seal width described above, the seal 105 is formed in an arc shaped surface without irregularities with respect to an imaginary cylindrical surface (surface along the side surface 102*c* of the nozzle 102) around the axis A1 as a center. Further, the side surface 102*c* (outer surface) of the nozzle 102 and an inner surface 102*f*, which is a back surface of the side surface 102*c*, are also formed in the arc shaped surface without irregularity with respect to the imaginary cylindrical surface around the axis A1 as a center, except for the discharge port 102*a*.

With this configuration, during a time when the shutter 103 pivots between the opening position and the closing position, or also in a case where the shutter 103 is in the closing position, the seal 105 and the side surface 102*c* of the nozzle 102 can stably come into contact with each other. Therefore, it is possible to prevent the leakage of the toner from the discharge port 102*a*.

Using FIGS. 6A and 6B, detailed configuration of the nozzle 102 and the shutter 103 will be described. An arrow N direction is a direction from the storage portion 101 toward the nozzle 102, and an arrow U direction is its opposite direction. The arrow N direction and the arrow U direction are directions parallel to the axis A1.

Figure 6A:
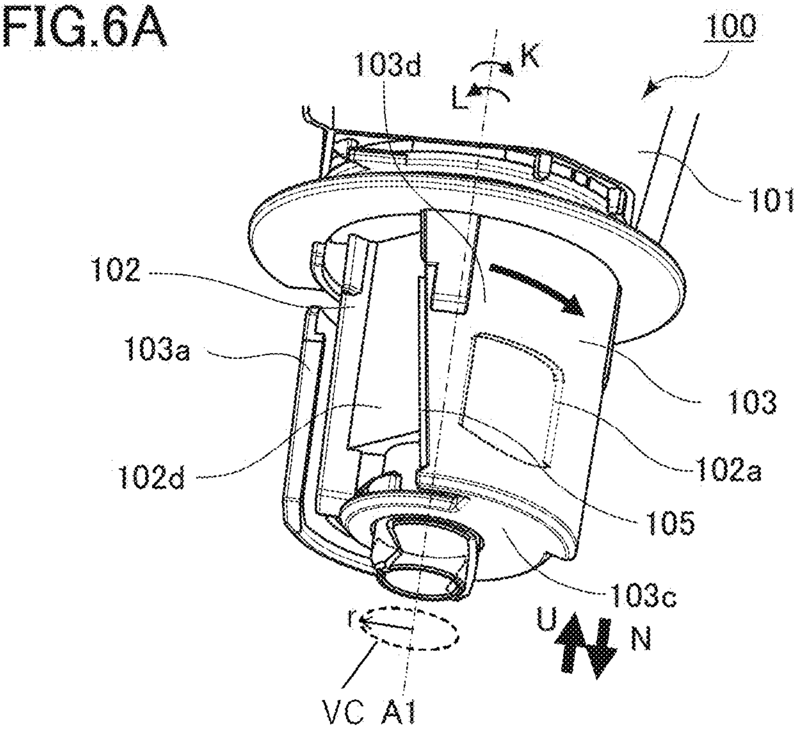
FIG. 6A is an enlarged perspective view illustrating a nozzle of the toner pack of the embodiment.
Figure 6B:
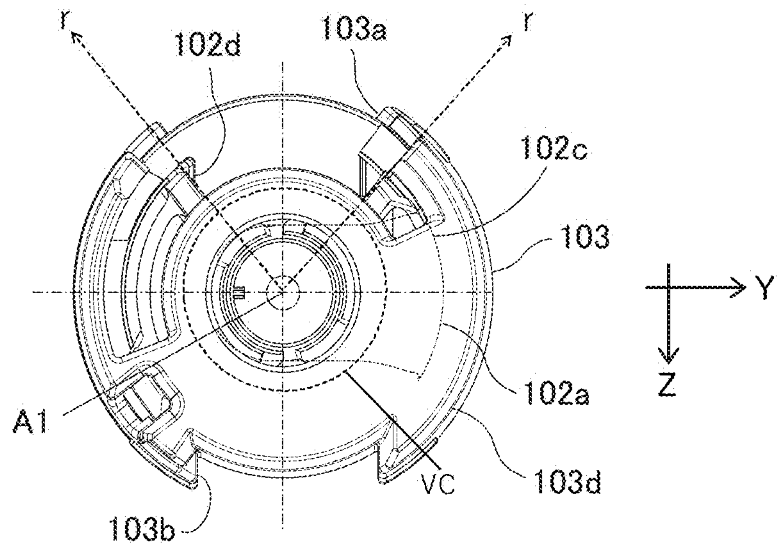
FIG. 6B is a bottom view illustrating the nozzle of the toner pack of the embodiment.

FIG. 6A is an exploded view illustrating the vicinity of the nozzle 102 at a time when the shutter 103 is in the closing position. FIG. 6B is a diagram illustrating the toner pack 100 viewed in the arrow U direction in FIG. 6A. The nozzle 102 includes a first recess portion 102*d*, serving as a positioned portion positioned at a time when the toner pack 100 is attached to the attaching portion 106 (FIG. 3) of the image forming apparatus 1. At a time when the shutter 103 is in the closing position, the first recess portion 102*d* of the nozzle 102 is exposed via the opening 103*a* of the shutter 103. The first recess portion 102*d* is configured such that, by engaging with a projecting portion (rotation regulating portion) disposed to the attaching portion 106, the nozzle 102 does not rotate in either direction around the axis A1 as a center. To be noted, as illustrated in FIG. 6B, when viewed in a direction of the axis A1, the first recess portion 102*d* and the discharge port 102*a* are in positions which do not overlap each other in the circumferential direction around the axis A1 as a center.

Further, the shutter 103 includes a second recess portion 103*b*, serving as an engaged portion in which, when viewed in the direction of the axis A1, part of the side surface 103*d* is recessed toward the axis A1. The second recess portion 103*b* is configured such that, by engaging with, for example, a projecting portion (engagement portion) of an operation lever (not shown) rotatably disposed to the attaching portion 106 of the image forming apparatus 1, the user can rotate the shutter 103 integrally with the operation lever.

Toner Replenishing Operation

Using the toner pack 100 of the present embodiment, a series of operations for replenishing the toner to the developing unit 30 of the image forming apparatus 1 will be described. The user opens the opening/closing member 83 (FIG. 3) of the image forming apparatus 1, and leaves the attaching portion 106 exposed. Then, while maintaining a posture in which the nozzle 102 faces the attaching portion 106, the user grasps and moves the toner pack 100 toward an attaching direction M (FIG. 3). At this time, the shutter 103 shall be in the closing position. In the present embodiment, the attaching direction M is a downward direction in the substantially vertical direction.

By respectively engaging the first recess portion 102*d*, serving as the positioned portion, and the second recess portion 103*b*, serving as the engaged portion, with the corresponding first projecting portion and second projecting portion of the attaching portion 106, the toner pack 100 becomes a state of being attached to the attaching portion 106. At this time, the rotation of the nozzle 102 is regulated, and, while the shutter 103 can rotate integrally with the operation lever, the shutter 103 is also in the closing position.

When the user rotates the operation lever in a predetermined rotational direction (refer to the arrow K direction of FIG. 4A), the shutter 103 rotates integrally with the operation lever, and moves to the opening position, so that the position of the opening 103*a* of the shutter 103 overlaps the discharge port 102*a* of the nozzle 102. Further, by the rotation of the shutter 103, the opening of the attaching portion 106 and the discharge port 102*a* face each other. Thereby, the space in the storage portion 101 of the toner pack 100 communicates with the space in the developer container 32 via the discharge port 102*a*, the opening of the attaching portion 106, and the opening 117*a* (FIG. 2A) of the developer container 32. Then, the toner in the interior of the storage portion 101 is discharged through the nozzle 102, and replenished to the interior of the developer container 32 via the communicating path described above.

To be noted, while, here, a configuration in which the nozzle 102 is secured at a time when the toner pack 100 is attached to the attaching portion 106 and the shutter 103 is opened/closed by being rotated by the operation lever is shown as an example, a method for opening and closing the shutter 103 is not limited to this. For example, it is acceptable to configure such that, at a time when the toner pack 100 is attached to the attaching portion 106, the shutter 103 engages with a fixing member on a side of the image forming apparatus 1 and the nozzle 102 engages with a rotatable member on the side of the image forming apparatus 1. Then, it is acceptable to configure such that, by the rotation of the nozzle 102 by the user in a predetermined rotational direction around the axis A1 as a center, the shutter 103 is relatively rotated with respect to the nozzle 102 and the discharge port 102*a* of the nozzle 102 is brought into an opening state.

Discharge Flow Path of Toner

Figure 7A:
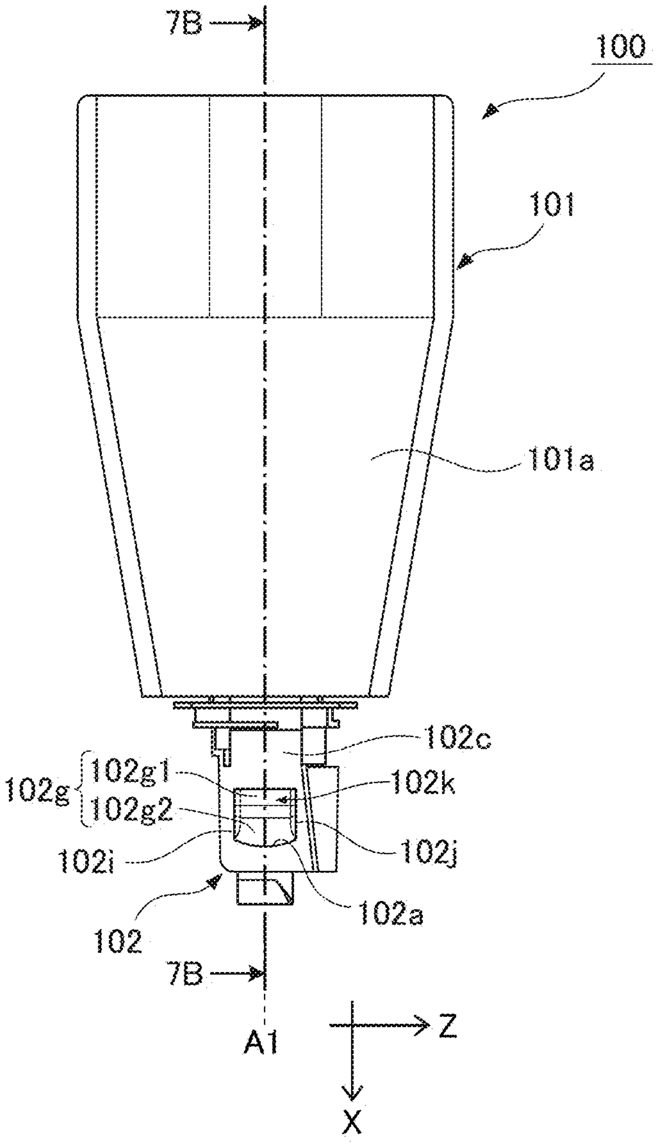
FIG. 7A is a front view illustrating a state in which toner is filled into the toner pack of the embodiment.
Figure 7B:
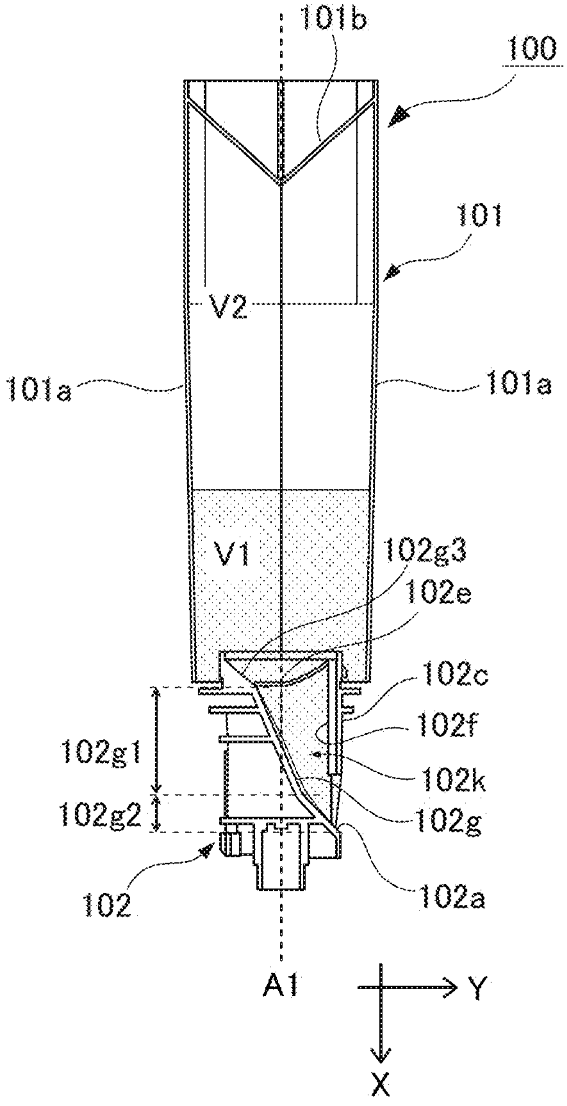
FIG. 7B is a cross-sectional view illustrating the state in which the toner is filled into the toner pack of the embodiment.

Next, using FIGS. 1A and 1B and FIGS. 7A and 7B, a discharge flow path of the toner will be described. FIG. 7B is a cross-sectional view illustrating the toner pack 100 taken along the line 7B-7B of FIG. 7A. An imaginary plane passing through the axis A1 of the nozzle 102 and a center of the discharge port 102*a* is a center plane of the toner pack 100.

As illustrated in FIG. 1B, the nozzle 102 includes a top surface portion 102*h* which is a surface on a first side (side of the first end, storage portion side, upper side in FIG. 1B) in the first direction X. The top surface portion 102*h* is a surface facing the space in the storage portion 101 (storage space). At least part of the top surface portion 102*h* is formed as the toner receiving portion 102*e*. The toner receiving portion 102*e* includes a mortar-shaped (conical) inclined surface extending from the outside toward the inside with respect to the axis A1 in the radial direction and to a second side (side of the second end, nozzle side, lower side in FIG. 1B) in the first direction X. That is, the toner receiving portion 102*e* is formed such that a cross-section area in the imaginary plane perpendicular to the first direction X becomes larger toward the first side in the first direction X. Thereby, it is possible to smoothly discharge the toner in the interior of the storage portion 101.

The nozzle 102 further includes the flow path 102*k* communicating from a bottom portion of the toner receiving portion 102*e* to the discharge port 102*a*. The flow path 102*k* is a space surrounded by an inclined portion 102*g* inclined with respect to the axis A1, the inner surface 102*f* facing the inclined portion 102*g*, and side walls 102*i* and 102*j* coupling the inclined portion 102*g* and the inner surface 102*f* to each other.

Hereinafter, so as to identify a preferred shape of the flow path 102*k*, a direction perpendicularly intersecting with the first direction X and in which the discharge port 102*a* is open toward the outside of the nozzle 102 is referred to as a second direction Y. Further, a direction perpendicular to both of the first direction X and the second direction Y is referred to as a third direction Z. Further, unless otherwise noted, an upper side and a lower side in the first direction X shall refer to an upper side and a lower side in a gravity direction (vertical direction) at a time when the nozzle 102 is oriented downward so as to attach the toner pack 100 to the attaching portion 106 of the image forming apparatus 1.

As illustrated in FIG. 1B, the inclined portion 102*g* is inclined with respect to the first direction X so as to extend in the second direction Y toward the lower side in the first direction X. The inclined portion 102*g* is a portion on whose upper surface the toner slides down toward the discharge port 102*a* in a case where the shutter 103 moves to the opening position and the discharge port 102*a* is opened.

The inclined portion 102*g* of the present embodiment includes a first inclined surface 102*g*1 and a second inclined surface 102*g*2 having inclination angles different from each other. The second inclined surface 102*g*2 is connected (continued) to a downstream side of the first inclined surface 102*g*1 in a flow direction of the toner in the flow path 102*k*. Further, the second inclined surface 102*g*2 is connected to a lower edge portion of the discharge port 102*a*, and extends from the discharge port 102*a* toward the upper side in the first direction X and a side (inside of the nozzle 102) opposite to the second direction Y. The first inclined surface 102*g*1 is connected to an upper end of the second inclined surface 102*g*2, extends from the second inclined surface 102*g*2 further toward the upper side in the first direction X and the side opposite to the second direction Y, and is connected to the toner receiving portion 102*e*. Further, the first inclined surface 102*g*1 intersects with the axis A1 of the nozzle 102.

In a cross-section (FIG. 1B) viewed in the third direction Z, the inclination angle θ1 of the first inclined surface 102*g*1 with respect to the second direction Y is larger than the inclination angle θ2 of the second inclined surface 102*g*2 with respect to the second direction Y. In other words, the inclination angle θ2 [degree] of the second inclined surface 102*g*2 with respect to an imaginary plane (imaginary plane extending in the second direction Y and the third direction Z) perpendicular to the axis A1 is smaller than the inclination angle θ1 [degree] of the first inclined surface 102*g*1 with respect to this imaginary plane ($0<\theta 2<\theta 1<90$).

To be noted, in the cross-section illustrated in FIG. 1B, a third inclined surface 102*g*3 further extending from an upper end of the first inclined surface 102*g*1 toward the upper side in the first direction X and the side opposite to the second direction Y is disposed. The inclined surface 102*g*3 constitutes a part of the toner receiving portion 102*e*. An inclination angle θ3 [degree] of the third inclined surface 102*g*3 (inclination angle of the toner receiving portion 102*e*) is smaller than the inclination angle θ1 of the first inclined surface 102*g*1 ($0<\theta 3<\theta 1<90$). Preferred inclination angles θ1, θ2, and θ3 of the inclined surfaces described above will be described below.

As illustrated in FIG. 1B, a boundary position between the first inclined surface 102*g*1 and the second inclined surface 102*g*2 in the first direction X is preferably positioned between a position of one end (first end) of the discharge port 102*a* and a position of the other end (second end) of the discharge port 102*a* (i.e., between the upper edge portion and a lower edge portion of the discharge port 102*a*). Thereby, it is possible to more smoothly discharge the toner. Further, a boundary position between the third inclined surface 102*g*3 and the first inclined surface 102*g*1 in the first direction X is preferably positioned between, in the first direction X, the discharge port 102*a* and the opening of the toner receiving portion 102*e* in the top surface portion 102*h*. Thereby, it is possible to receive an increased quantity of the toner in the flow path 102*k* and reduce residual toner.

The inner surface 102*f* spreads along an arc around the axis A1 as a center, and extends in the first direction X between the upper edge of the discharge port 102*a* and the top surface portion 102*h*. The side walls 102*i* and 102*j* are surfaces spreading in the first direction X and the second direction Y so as to connect the inclined portion 102*g* and inner surface 102*f* to each other. As illustrated in FIG. 1A, the two side walls 102*i* and 102*j* are positioned on one side and the other side of the axis A1 of the nozzle 102 in the third direction Z, and face each other in the third direction Z. The side wall 102*i* is a first side wall spreading in the first direction X and the second direction Y so as to connect the inclined portion 102*g* and the inner surface 102*f* to each other on the one side in the third direction Z. The side wall 102*j* is a second side wall spreading in the first direction X and the second direction Y so as to connect the inclined portion 102*g* and the inner surface 102*f* to each other on the other side in the third direction Z.

As described above, in a case where the nozzle 102 is cut by an imaginary plane spreading in the second direction Y and the third direction Z between the toner receiving portion 102*e* and the discharge port 102*a*, the flow path 102*k* is formed by the inclined portion 102*g*, a back surface of the side surface 102*c*, and the side walls 102*i* and 102*j*.

Here, by using a case as a comparative example in which the inclined portion 102*g* is not disposed in the flow path 102*k* and a flow path of the nozzle 102 is formed in a straight shape, an advantage of the flow path 102*k* including the inclined portion 102*g* will be described. A straight shaped flow path is a cylindrically or prismatically shaped flow path extending in the first direction X in the inside of the nozzle 102, and the discharge port 102*a* is formed in a side wall of a cylinder or a prism. In this case, when the user performs a toner discharge operation by opening the shutter 103, it is difficult to move the toner existing in a position far from the discharge port 102*a* in the inside of the flow path to the discharge port 102*a*, and the discharge ends in a state in which part of the toner is accumulated (retained) inside of the flow path.

In the comparative example, two layers which are different from each other in behavior exist in the toner accumulated inside of the straight shaped flow path. An immobile layer which is a layer of the toner which does not move at all from the opening of the shutter 103 to an end of the discharge is formed near a bottom portion of the flow path. The height of an upper surface of the immobile layer from a bottom of the flow path becomes higher the farther a distance from the discharge port 102*a* becomes. On the other hand, an angle-of-repose layer is formed on the immobile layer. The angle-of-repose layer is a layer which moves temporarily shortly after the opening of the shutter 103, which, thereafter, does not move and forms an inclined surface of a certain angle, and on which the toner slides down toward the discharge port 102*a*. Further, in the comparative example, near the discharge port 102*a*, the toner slid on the immobile layer with an inclination angle smaller than the angle-of-repose layer, and, in a position slightly far from the discharge port, the toner slid on the angle-of-repose layer.

So as to check the immobile layer and the angle-of-repose layer, for example, the following method is used. First, prepare a plurality of colors of toners which are the same except for colored colors, and fill the plurality of colors of the toners inside of the toner pack 100 in layers. Then, discharge the toners in the interior of the toner pack 100 by opening the shutter 103, and observe the behavior of the toners in the inside of the nozzle 102. At this time, a region in which the color of the toner does not change from the beginning of the discharge is referred to as the immobile layer. Further, a region in which the color of the toner changes from a first color of the toner to a color of the toner directly above shortly after the beginning of the discharge but a change is not observed (toner does not move) thereafter is referred to as the angle-of-repose layer.

When, as with the comparative example described above, the straight shaped flow path is applied, there is a possibility that the smooth discharge of the toner will be blocked by the tonner accumulated inside of the flow path. Therefore, in the present embodiment, it is configured such that, by disposing the inclined portion 102*g* inclined with respect to the first direction X, the toner slides down on the upper surface of the inclined portion 102*g* toward the discharge port 102*a*. So as to reduce an accumulation of the toner in the inside of the flow path 102*k*, at least part of inclination angles of the inclined portion 102*g* is preferably equal to or larger than an angle of repose of the toner. In particular, based on observation on the toner behavior in the comparative example, it was suitable to set the inclination angle θ1 of the first inclined surface 102*g*1 at equal to or more than the angle of repose and the inclination angle θ2 of the second inclined surface 102*g*2 at equal to or more than an angle of the immobile layer.

Further, the length of the first inclined surface 102*g*1 in the first direction X is configured to be longer than the length of the second inclined surface 102*g*2 in the first direction X (FIG. 1B). Thereby, since the toner slides down by gaining momentum on the first inclined surface 102*g*1, the discharge of the toner becomes smoother.

In the configuration example of the present embodiment, the angle of repose of the toner is 67 degrees, and by the observation of the comparative example, the inclination angle of the immobile layer was 43 degrees. Therefore, by setting the inclination angle θ1 of the first inclined surface 102*g*1 at 67 degrees and setting the inclination angle θ2 of the second inclined surface 102*g*2 at 43 degrees, the toner becomes hard to accumulate inside of the flow path 102*k*, and it is possible to smoothly discharge the toner in the interior of the storage portion 101 from the discharge port 102*a*.

Further, the inclination angle θ3 of the third inclined surface 102*g*3 (inclination angle of the toner receiving portion 102*e*) is set such that, at a time when the user performs the toner discharge operation, a portion adjacent to a connection to the nozzle 102 of the storage portion 101 can be pushed in the toner receiving portion 102*e*. The inclination angle θ3 of the third inclined surface 102*g*3 is set at, for example, 40 degrees.

To be noted, it is also conceivable to form the whole of the inclined portion 102*g* at a fixed angle. However, for example, if the whole of the inclined portion 102*g* is formed at the inclination angle θ1 equal to the first inclined surface 102*g*1 of the present embodiment, while a difficulty in the accumulation of the toner is equivalent to the present embodiment, the flow path 102*k* is lengthened in the first direction X, so that the enlargement of the toner pack 100 is led. Further, for example, if the whole of the inclined portion 102*g* is formed at the inclination angle θ2 equal to the second inclined surface 102*g*2 of the present embodiment, while the accumulation of the toner becomes less likely to occur in comparison with the straight shaped flow path, there is the fear that, in comparison with the present embodiment, the accumulation of the toner may occur on the inclined portion 102*g*. In contrast, in the present embodiment, by combining the first inclined surface 102*g*1 and the second inclined surface 102*g*2 whose inclination angles are different from each other, while avoiding the enlargement of the toner pack 100, it is possible to sufficiently reduce the accumulation of the toner.

Further, as the inclination angle of the inclined portion 102*g*, it is suitable to consider the slipperiness of the toner on a material forming the inclined portion 102*g*. For example, it is suitable that at least part of the inclined portion 102*g* is formed at an inclination angle at which, in a case where the same sheet material as a material forming the inclined portion 102*g* is tilted at a predetermined inclination angle and the toner is dropped from above, the toner does not accumulate but slides down.

With the configuration of the flow path described above, by the deformation of the storage portion by the user in a state in which the toner pack 100 is attached to the image forming apparatus 1 and the shutter 103 is opened, it is possible to easily discharge the toner in the interior of the toner pack 100.

Filling Ratio of Toner and Discharge Performance of Toner

Figure 8:
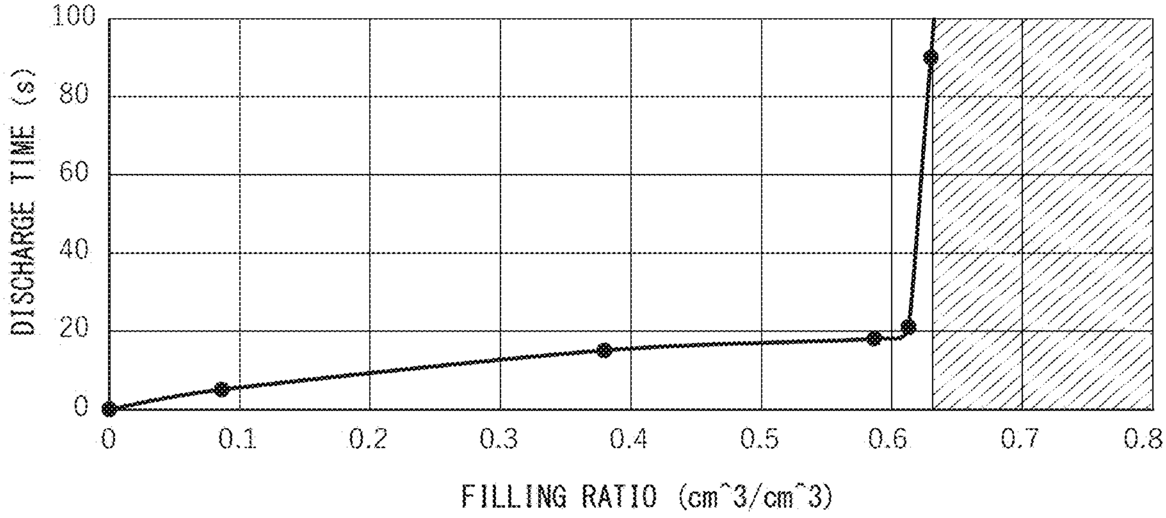
FIG. 8 is a diagram illustrating a relationship between a filling ratio of the toner and discharge time in the toner pack of the embodiment.

Next, using FIGS. 7 and 8, a relationship between a filling ratio and a discharge time of the toner will be described. FIG. 8 is a graph illustrating a required time (discharge time) for the user to discharge all of the toner by deforming the storage portion 101 at a time when a toner amount filled into the storage portion 101 is increased and decreased.

In measuring the discharge time, in a state of supporting one surface of the storage portion 101 with four fingers other than a thumb, the user expedites the discharge of the toner from the toner pack 100 by pressing the other surface of the storage portion 101 with the thumb and deforming the storage portion 101. At this time, by performing an operation of sequentially pressing an upper part, a center part, and a lower part of the storage portion 101 as one set, the user repeatedly presses the storage portion 101 until the discharge of the toner ends.

As the toner pack 100 used for an experiment of FIG. 8, the toner pack having a capacity (entire capacity of the toner pack 100) of 225 cubic centimeters ($cm^3$) is used. The capacity of the toner pack 100 refers to a volume of a space which becomes the interior of the toner pack 100 with respect to the discharge port 102*a*, and a volume of an entire space into which the toner can be filled. The capacity of the toner pack 100 in the present embodiment includes the space (storage space) in the interior of the storage portion 101 and a space in the inside of the nozzle 102 allowing this space in the interior of the storage portion 101 and the discharge port 102*a* to communicate with each other. In particular, the space in the nozzle 102 is a space from the discharge port 102*a*, passing through the flow path 102*k* and the inside of the toner receiving portion 102*e*, to a position of the top surface portion 102*h* (position coming into contact with the top surface portion 102*h* in a Y-Z plane) of the nozzle 102 in the first direction X. The capacity of the toner pack 100 can be determined by such as, for example, in a state in which the toner is not filled into the storage portion 101, injecting water via the discharge port 102*a* until the whole of the toner pack 100 is filled with the water and calculating a difference in the weight of the toner pack before and after a water injection.

To be noted, the capacity of the storage portion 101 used for the experiment is 215 $cm^3$, and the height of the storage portion 101 in the first direction X is 116 millimeters (mm).

However, the capacity of the storage portion 101 refers to a volume of a space surrounded by the side surface portion 101*a* of the storage portion 101, the bottom surface portion 101*b*, and a surface (Y-Z plane coming into contact with the top surface portion 102*h*) along the top surface portion 102*h* of the nozzle 102. The capacity of the storage portion 101 does not include the space inside of the flow path 102*k* of the nozzle 102. The opening area of the discharge port 102*a* is 196 square millimeters ($mm^2$) (14 mm square), and a cross-section area of a place (cross-section position passing through the upper edge of the discharge port 102*a* and a boundary between the first inclined surface 102*g*1 and the second inclined surface 102*g*2) with the smallest cross-section area on the flow path 102*k* is 196 $mm^2$. Further, the angle of repose of the toner used for the experiment is 67 degrees, and specific gravity is 1.08 grams (g)/$cm^3$.

By being filled with the toner, as illustrated in FIG. 7, the storage portion 101 is divided into an area V1 in which the toner accumulates and an area (air area) V2 in which the toner does not exist. In a case where the capacity (V1+V2) of the toner pack 100 at this time is referred to as a [$cm^3$] and a volume of filled tonner is referred to as b [$cm^3$], a filling ratio c can be expressed by c=(b/a).

As illustrated in FIG. 8, in a case where the filling ratio is equal to or more than 0.63 (region of oblique lines), the discharge time becomes equal to or more than 90 seconds, and it is found that, even if the user deforms the storage portion 101, it is difficult to easily discharge the toner. In the case where the filling ratio is equal to or more than 0.63, even if the shutter 103 is opened, the toner is hardly discharged from the discharge port 102*a*, and the toner is discharged in small quantities at a time by the deformation of the storage portion 101 by the user. On the other hand, in a case where the filling ratio is set at less than 0.63, the discharge time is sharply shortened.

The following are considered as reasons why the discharge of the toner is blocked in a case where the filling ratio is large. (a) By increasing the weight of the toner in the interior of the storage portion 101 and increasing an accumulated height in the interior of the storage portion 101, the toner adjacent to the discharge port is compressed, and bridging is generated. (b) At a time when the user presses the storage portion 101, an effect of decreasing fluidity (blockage in discharge) due to the compression of the toner becomes larger than an increase in a vessel internal pressure (promotion of discharge) by the compression of the air area. In contrast, if the filling ratio is reduced, these reasons are resolved, and the toner is smoothly discharged by flowing through the flow path 102*k* of the nozzle 102 along with air. Further, if the filling ratio is small, at a time when the user shakes the toner pack 100 as preparation for the discharge operation, the air and the toner are sufficiently mixed, and an effect to improve the fluidity due to a reduction in a bulk density of the toner is increased, so that the discharge of the toner becomes easier.

Therefore, so as to provide the toner pack 100 from which the user can easily discharge the toner, the filling ratio should be set at less than 0.63. Since the specific gravity of the toner used for the experiment is 1.08 g/$cm^3$, the condition described above corresponds to less than 0.68 at a ratio (d/a) between the weight of the filled toner d [g] and the capacity a [$cm^3$] of the storage chamber 101.

Further, by reducing the filling ratio, discharge performance is further improved. Therefore, the filling ratio is preferably equal to or less than 0.6, and more preferably equal to or less than 0.55. On the other hand, if the filling ratio is too small, so as to fill a predetermined amount of the toner, there is the fear that the large storage portion 101 may become enlarged, or that, since only a small quantity of the toner is filled, multiple times of toner replenishment may be needed. Therefore, the filling ratio is preferably equal to or more than 0.3, and more preferably equal to or more than 0.4. That is, the filling ratio is suitably set in a range of equal to or more than 0.3 and equal to or less than 0.6, and more suitably set in a range of equal to or more than 0.4 and equal to or less than 0.55.

With these configurations, the user can smoothly discharge the toner without taking time more than necessary by squashing the storage portion 101 by the user.

OTHER EMBODIMENTS

While, in the present embodiment, the inclined portion 102*g* is disposed in the flow path 102*k* in the inside of the nozzle 102, in a case where the accumulation of the tonner can be allowed, it is acceptable to apply the straight shaped flow path described in the comparative example. Even in such a case, by setting the filling ratio in the range described above, the user can easily discharge the toner.

Further, while, in the present embodiment, it is described that the toner is discharged from the discharge port 102*a* disposed in the side surface 102*c* of the nozzle 102, it is acceptable to dispose the discharge port 102*a* in a bottom surface (surface on the side of the second end in the first direction X) of the nozzle 102.

According to the present invention, it is possible to provide one aspect of toner containers and image forming systems.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The present invention can be used for toner containers storing toner and image forming systems forming an image on a recording material by using the toner.

What is claimed is:

1. A toner container comprising:

a storage portion configured to store toner; and a nozzle aligned with the storage portion in a first direction (X) and provided with a receiving port configured to receive the toner stored in the storage portion, a discharge port through which the toner is discharged to outside of the toner container and which opens in a second direction (Y) perpendicular to the first direction, and a passage configured to allow the toner to pass through from the receiving port to the discharge port and including a first surface and a second surface, wherein, when the toner container is oriented in a predetermined direction in which the first direction is parallel to a gravity direction and the nozzle is below the storage portion, on a cross-section of the nozzle which is viewed in a direction (Z) perpendicular to the first and second directions and on which the passage is positioned:

(i) the receiving port opens upward and is positioned above the discharge port, (ii) the first surface is provided above the second surface, the first surface is continuous with the second surface via a boundary portion, and the first surface is inclined downward toward the discharge port in a horizontal direction, (iii) the second surface is inclined downward toward the discharge port in the horizontal direction, and an inclination angle of the second surface with respect to the horizontal direction is less than an inclination angle of the first surface with respect to the horizontal direction, and (iv) the boundary portion is positioned between an upper end of the discharge port and a lower end of the discharge port in the gravity direction.

2. The toner container according to claim 1, wherein the storage portion includes a bag body formed of a flexible film material.

3. The toner container according to claim 1, wherein the passage includes a third surface that is provided above the first surface, is continuous with the first surface, and is closer to the receiving port in the first direction than the first surface is to the receiving port in the first direction, wherein, when the toner container is oriented in the predetermined direction, on the cross-section, the third surface is inclined downward toward an upper end of the first surface in the horizontal direction, and an inclination angle of the third surface with respect to the horizontal direction is less than the inclination angle of the first surface with respect to the horizontal direction.

4. The toner container according to claim 1, wherein, when the toner container is oriented in the predetermined direction, on the cross-section, the passage includes an inner surface facing the first surface, and wherein the inner surface extends along the gravity direction.

5. The toner container according to claim 1, further comprising a shutter disposed outside of the nozzle in a radial direction of an imaginary circle that is centered around a rotational axis around which the shutter is rotatable between a closed position where the shutter closes the discharge port and an open position where the shutter opens the discharge port, with the rotational axis extending in the first direction.

6. The toner container according to claim 1, wherein, when the toner container is oriented in the predetermined direction, on the cross-section, the inclination angle of the first surface with respect to the horizontal direction is equal to or greater than an angle of repose of the toner filled in the toner container, and wherein the inclination angle of the second surface with respect to the horizontal direction is less than the angle of repose of the toner filled in the toner container.

7. The toner container according to claim 1, wherein, when the toner container is oriented in the predetermined direction, on the cross-section, a length of the first surface in the gravity direction is longer than a length of the second surface in the gravity direction.

8. An image forming system comprising:

the toner container according to claim 1; and an image forming apparatus configured to form an image on a recording material by using the toner replenished from the toner container, wherein the image forming apparatus includes an attaching portion to which the toner container is attachable in a state with the toner container is oriented in the predetermined direction.

* * * * *